INVENTORS
William S. Castle,
Douglas K. Thompson
& Henry M. Mar
BY F. J. Fiodale
ATTORNEY

3,320,749
REGENERATIVE FAN ENGINE
William S. Castle, Douglas K. Thompson, and Henry M. Mar, Indianapolis, Ind., assignors to General Motors Corporation, Detroit, Mich., a corporation of Delaware
Filed Oct. 4, 1965, Ser. No. 492,558
7 Claims. (Cl. 60—226)

Our invention relates generally to a ducted fan type gas turbine engine and more particularly to a regenerative ducted fan type gas turbine engine. The ducted fan type gas turbine or fan jet is a generally well known type of power plant which has been designed to fill the flight regime gap between the pure jet and the turboprop. It incorporates desirable features of both and as such has characteristics lying somewhere between those of the two aforementioned types of power plants.

It is likewise well known that the increased efficiency which may be obtained from a basic thermodynamic cycle by adding a regenerative cycle can be applied to a gas turbine engine. Physically, the regenerative cycle expresses itself in the form of a regenerative heat exchanger with compressor discharge air flowing through the "cold" side prior to its delivery to the burner section of the engine and the "hot" side being supplied by exhaust gases after they have been expanded through the turbine section. The regenerator, however, has a drawback in that either the engine casing must be enlarged to accommodate the regenerator structure internally or the regenerator structure must be mounted externally. In the fan type jet, an increase in engine diameter is highly undesirable because of the necessity of also increasing the fan diameter and the speed matching problems associated therewith. The better solution then appears to be to retain the engine diameter and include external regenerator structure. This solution, however, has its problem also in that the external regenerator structure will interfere with the fan air flow.

Our invention is directed toward reconciling the two diverse requirements of this solution, that is, an open unobstructed fan flow and the inclusion of regenerator structure outboard of the gas turbine casing. It is an object of our invention then to provide a ducted fan engine with a regenerator while minimizing both the overall diameter of the resulting engine and the obstruction to the fan air flow. We have generally accomplished this by a unique and novel arrangement of regenerator configuration and ducting.

Other objects and features of the invention will become apparent to those skilled in the art as the disclosure is made in the following detailed description of a preferred embodiment of the invention as illustrated in the accompanying sheet of drawings in which.

Figure 1:
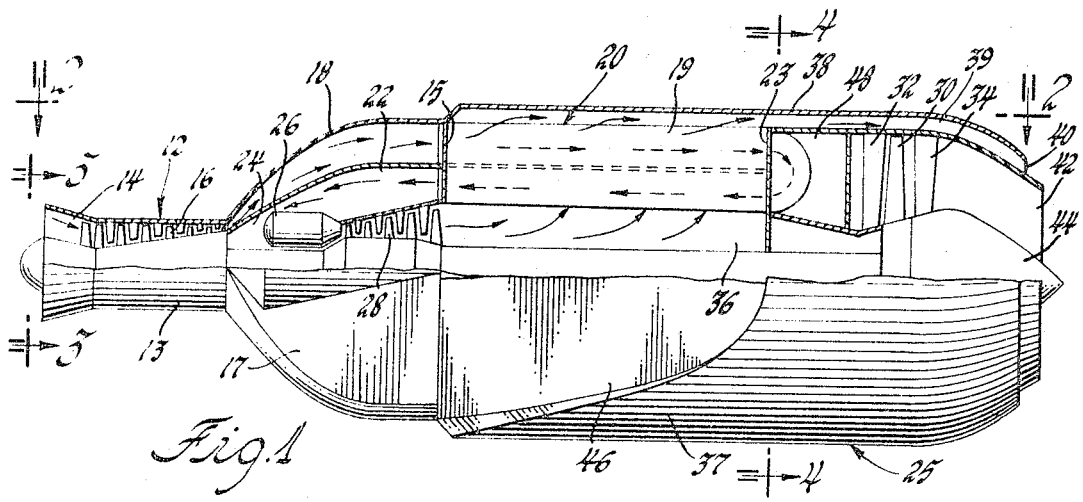
FIGURE 1 is a schematic elevation view of a regenerative fan engine embodying our invention partially broken away for clarity.

Referring now to FIGURE 1 in detail, we have indicated our regenerative fan engine generally by the numeral 12. It comprises a conventional cylindrical casing 13 with an inlet 14 and an axial multi-stage compressor 16 in the conventional serial arrangement. The outlet of the compressor 16 communicates with duct 18 which in turn leads to a number of elongated U-tubes 19 which form a part of regenerator 20. A second duct 22 located just radially inwardly of the duct 18 leads from the outlets of the U-tubes 19 back into the combustion zone 24. As shown, the transition from the single passage ducts to the multiple passages of the plurality of U-tubes 19 is accomplished by mounting the upstream ends of the U-tubes 19 in the vertical wall 15 at the downstream ends of the ducts 18 and 22. The downstream or bent ends of the U-tubes 19 are mounted in a second vertical wall 23. The ducts 18 and 22 share a common wall and increase both in height and width from the outlet of compressor 16 to the first vertical wall 15. The cross section of the ducts at any point is substantially rectangular but being curved where necessary to fit existing engine contours. There are two sets of ducts, an upper and lower, which have their side walls meeting to form a pair of contiguous flat side walls 17. The walls 17 are interrupted by the round gas turbine casing walls 13 adjacent the combustion section 24.

The combustion zone 24 includes a number of circumferentially spaced combustion cans 26 which add fuel to the compressed air which was preheated in the U-tubes 19. The mixture is then burned and the combustion products directed out the aft ends of the cans 26 toward the turbine wheels 28. The turbine wheels 28 remove energy from the combustion products expanded through them and drive the compressor 16 and an aft fan 30 located adjacent the downstream end of the fan engine 12. Between the turbine wheels 28 and the aft fan 30 is an exhaust chamber 36 which receives the exhaust gases from the turbine wheels 28. The chamber 36 is substantially rectangular in cross section being formed by a pair of parallel side walls 21 equidistant from the center of the circular engine casing 13 and the arcuate segments of the bifurcated forward portion 37 of shroud 25. The width of the chamber 36 is approximately equal to the diameter of the gas turbine casing at that point. The diametrically opposed portions of the chamber 36 which extends beyond the engine casing are housed by the vertical walls 15 and 23 and the side walls 21. The side walls 21 of the chamber 36 meet the side walls 17 at their forward end. The exhaust gases entering the chamber 36 from the turbine outlet flow radially outwardly over the U-tubes 19 where heat is transferred to the air within the tubes 19 prior to its delivery to the combustion zone 24. The housed outer portions of chamber 36 and the U-tubes 19 disposed therein thus form the regenerator 20.

Figures 3, 4:
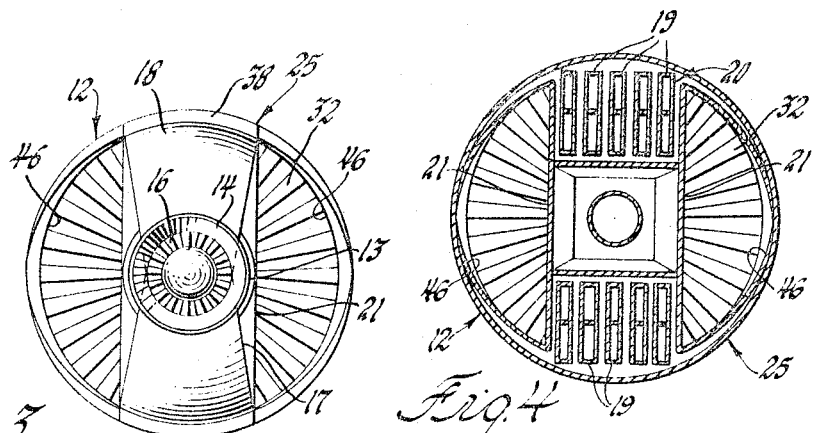
FIGURE 3 is a section taken substantially along the line 3—3 of FIGURE 1 and looking in the direction of the arrows.
FIGURE 4 is a section taken substantially along the line 4—4 of FIGURE 1 and looking in the direction of the arrows.

The shroud 25 is hollow and forms an exhaust duct 38. After the exhaust gases flow radially over the regenerator tubes 19, they enter the hollow bifurcated forward portion 37 of the shroud 25 which is both mechanically and fluidly connected to the radially outer ends of the housed regenerator 20. The aft portion of the exhaust duct 38 formed by the hollow shroud 25 expands into a full annulus 39 having an annular outlet 40. The aft end of the shroud 25 is secured to the casing 13 by a guide vane ring 32. The shroud 25 together with the engine casing 13 forms the bypass passage 48 in which is rotatably mounted the aft fan 30. The bifurcated forward exhaust duct portion 37 together with the flat side walls 21 forms an inlet 46 for the bypass passage 48. The inlet 46 approximates a pair of segments of a circle as shown in FIGURES 3 and 4. The middle blocked out segment is occupied by the regenerator 20. A second guide vane ring 34 is provided downstream of the aft fan 30 and mounts a bullet 44 centrally within the shroud 25 to form an exhaust nozzle 42 for the bypass passage 46.

Figure 2:
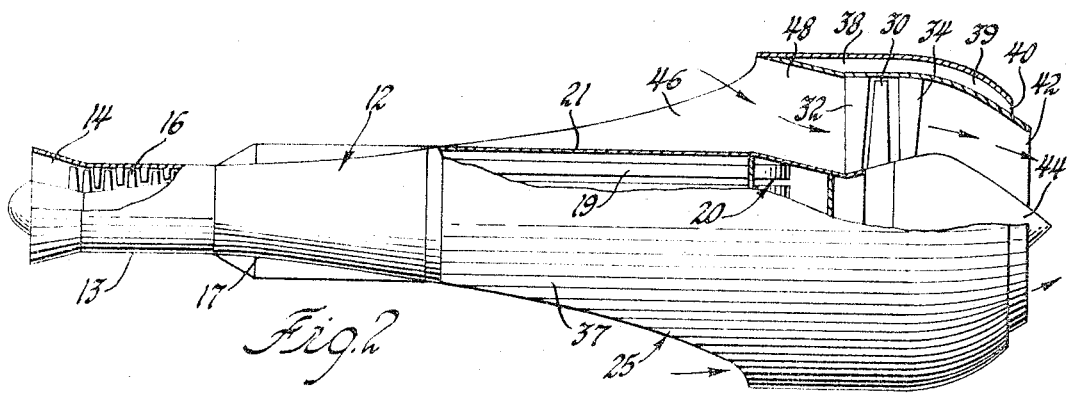
FIGURE 2 is a section taken substantially along the line 2—2 of FIGURE 1 and looking in the direction of the arrows. It also is partially broken away for clarity.

The operation of our device should be obvious from the foregoing description; however, it will now be explained in reference to FIGURES 1 and 2, where we have indicated the flow of air through the conventional regenerative gas turbine engine by small black arrows and the flow of bypass air by larger open face arrows.

Air enters the inlet 14 and is compressed in the compressor 16 in the conventional manner. The compressed air then enters regenerator 20 via duct 18 where it is preheated. The heated compressed air enters the combustion zone 24 through the return ducts 22 where fuel is added and the resulting mixture is burned. The combustion products are then expanded through the turbine wheels 28 which take energy out of the combustion products to drive the compressor 16 and the aft fan 30. The gases are then exhausted through the regenerator 20 where they provide the heat source to preheat the compressed air within the tubes 19. From the regenerator 20, the exhaust gases are delivered to the duct 38 and exhausted through outlet 40.

During the above thermodynamic cycle, bypass air is being supplied to the aft fan 30 through the inlet 46. The inlet 46 comprises a pair of segments of a circle. The inlet 46 expands into a full annular bypass passage 48 where the aft fan 30 is located. The air entering the inlet 46 and passage 48 is guided by the upstream guide vane ring 32 into the aft fan 30. The air from the fan 30 is guided by the downstream vane ring 34 into the annular exhaust nozzle 42.

Thus it can be seen that we have provided a regenerative fan engine which reconciles the somewhat conflicting requirements of the ducted fan and the regenerative engine taken separately. We have limited our outboard regenerators structure to relatively narrow housing of circular segmental cross section leaving a pair of relatively large circular segments as an inlet for the aft fan 30. We have thus minimized the interference to the aft fan flow while reaping the benefits associated with a regenerative addition to a basic thermodynamic cycle. In addition, we have accomplished this without increasing either the fan or engine diameters.

Various modifications are contemplated and may obviously be resorted to by those skilled in the art without departing from the spirit and scope of the invention as hereinafter defined by the appended claims as only a preferred embodiment thereof has been disclosed.

We claim:

1. A regenerative ducted fan gas turbine engine comprising, in combination, a gas turbine power unit including a compressor inlet and a generally cylindrical casing, a fan concentric with said casing and projecting outwardly of the casing, a shroud mounted concentrically on said casing and enclosing said fan to provide an annular bypass passage, said power unit including regenerator means transferring heat to its inlet air, a regenerator housing extending outwardly from the casing generally to the radius of the shroud and blocking a portion of the annular outline of said bypass passage ahead of said fan and an inlet to the bypass passage occupying the remaining portion of the bypass passage outline, said bypass inlet being aft of said compressor inlet.

2. The engine defined in claim 1 wherein said shroud is hollow forming a chamber having an inlet and an outlet, said inlet being fluidly connected to said regenerator housing and forming a part of the exhaust system for said power unit.

3. The engine defined in claim 2 wherein said shroud has a hollow forward bifurcated portion, and said regenerator housing is in fluid communication with said bifurcated portion along the entire axial length of its diametrically opposed outer ends.

4. The engine defined in claim 1 including closed conduit means having inlet and outlet means disposed in said regenerator housing, first duct means extending between the power unit compressor and said inlet means and second duct means extending between said outlet and the power unit combustor, said first and second duct means being in axial alignment with said regenerator housing.

5. The engine defined in claim 2 including closed conduit means having inlet and outlet means disposed in said regenerator housing, first duct means extending between the power unit compressor and said inlet means and second duct means extending between said outlet and the power unit combustor, said first and second duct means being in axial alignment with said regenerator housing.

6. The engine defined in claim 3 including closed conduit means having inlet and outlet means disposed in said regenerator housing, first duct means extending between the power unit compressor and said inlet means and second duct means extending between said outlet and the power unit combustor, said first and second duct means being in axial alignment with said regenerator housing.

7. A regenerative ducted fan gas turbine engine comprising, in combination,
a gas power unit including a compressor, a combustor, a turbine and an exhaust chamber in serial arrangement in a generally cylindrical casing,
a pair of diametrically opposed housings in fluid communication with said exhaust chamber extending radially from said casing,
a hollow shroud open at its aft end mounted on said casing to form a bypass passage therewith, said shroud being in fluid communication with said housings,
conduit means located radially outwardly of said casing and extending between said compressor and combustor, a portion of said conduit means being disposed in said housings whereby heat is transferred from the exhaust gas of said turbine to the compressor discharge air and
a fan in said bypass passage aft of said housings.

References Cited by the Examiner

UNITED STATES PATENTS

| | | | |
|---|---|---|---|
| 2,930,190 | 3/1960 | Rogers | 60—226 |
| 3,117,750 | 1/1964 | Snell | 60—226 |
| 3,267,673 | 8/1966 | Hemsworth | 60—39.51 |

FOREIGN PATENTS 270,342 11/1950 Switzerland.

MARK NEWMAN, *Primary Examiner.*

D. HART, *Assistant Examiner.*